United States Patent
Szuba et al.

(10) Patent No.: US 7,077,679 B1
(45) Date of Patent: Jul. 18, 2006

(54) RETENTION CLIP FOR CONDUCTIVE BRIDGE JOINED TO PC BOARD

(75) Inventors: Scott A. Szuba, East Kingston, NH (US); George A. Sorensen, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/007,692

(22) Filed: Dec. 8, 2004

(51) Int. Cl.
*H01R 13/62* (2006.01)
*H01R 31/08* (2006.01)

(52) U.S. Cl. ..................................... 439/327; 439/507
(58) Field of Classification Search ................ 439/327, 439/507–515; 361/801
See application file for complete search history.

(56) References Cited

U.S. PATENT DOCUMENTS

| | | | | |
|---|---|---|---|---|
| 3,270,251 A | * | 8/1966 | Evans | 361/729 |
| 3,806,767 A | * | 4/1974 | Lehrfeld | 361/803 |
| 3,858,961 A | * | 1/1975 | Goodman et al. | 439/631 |
| 4,028,794 A | * | 6/1977 | Ritchie et al. | 29/882 |
| 4,250,536 A | * | 2/1981 | Barringer et al. | 361/787 |
| 4,384,754 A | * | 5/1983 | Douty et al. | 439/74 |
| 4,475,781 A | * | 10/1984 | Asick et al. | 439/61 |
| 4,490,000 A | * | 12/1984 | Asick et al. | 439/75 |
| 4,806,105 A | * | 2/1989 | Muzslay | 439/74 |
| 5,195,897 A | * | 3/1993 | Kent et al. | 439/67 |
| 5,734,551 A | * | 3/1998 | Hileman et al. | 361/695 |

* cited by examiner

*Primary Examiner*—Neil Abrams
(74) *Attorney, Agent, or Firm*—Patterson & Sheridan, L.L.P.

(57) ABSTRACT

This clip is used to secure a connection bridge onto the top edge of two graphics adaptor cards. It works by securing with a screw through the graphics adaptor card bracket that when tightened, applied downward pressure onto the bridge. The pressure is created by the bump above the screw boss; when the screw is tightened the bump acts as a pivot point and applied downward force on the other side of the pivot point to the bridge.

14 Claims, 4 Drawing Sheets

RETENTION CLIP FOR CONDUCTIVE BRIDGE JOINED TO PC BOARD

BACKGROUND OF THE INVENTION

1. Field of the Invention

One or more aspects of the invention relate generally to printed circuit boards and packaging, and more particularly to a clip for retaining a connection bridge device in place connecting add-on cards such as a graphics adaptor card or the like in place on a printed circuit board.

2. Description of the Related Art

The increased processing power needed to support high end graphics processing systems has made the use of two or more graphics adaptor cards in a single system increasingly desirable. Typically, such cards are supported in parallel from the printed circuit board that support the other elements of the processing system. They are electrically connected by a connection bridge device comprising a printed circuit board having socket connectors pressed over an array of conductive fingers defined on an edge of each graphics adaptor card.

A problem arises with retaining the connection bridge device in place and firmly electrically connected to each of the two graphics adaptor cards in the face of the shock and vibration which may occur, for example, during shipping of the complete processing system. The normal friction which is achieved between such socket connectors on the connection bridge device and the conductive fingers on each graphics adaptor cards can be overcome by such shock and vibration. Efforts to increase the friction between the sockets of the connection bridge device and the pins on the graphics adaptor card by enlarging, thickening, or otherwise modifying the material used have not proven successful.

Accordingly, it is desirable to facilitate maintaining the bridge in place between the cards even when the system is exposed to such shock and vibration.

SUMMARY OF THE INVENTION

The present invention provides means for maintaining the bridge between graphics adaptor cards in place which is inexpensive to fabricate and install.

In one embodiment a clip is provided which is supported from a graphics adaptor card bracket that expends perpendicular to one of the graphics adaptor cards.

A clip is used to secure a small PCB onto the top edge of two graphics adaptor cards. The clip is secured with a screw through the graphics adaptor card bracket; when tightened, the clip applies downward pressure onto the board. The pressure is created by a bump above the screw hole; when the screw is tightened, the bump acts as a pivot point and applied downward force on the other side of the pivot point to the board.

BRIEF DESCRIPTION OF THE DRAWINGS

Accompanying drawings show exemplary embodiments in accordance with one or more aspects of the invention; however, the accompanying drawings should not be taken to limit the invention to the embodiments shown but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The present invention is described in the context of a graphics processing system (see FIG. 3, to be described in further detail below) including at least two graphics adaptor cards 340, 360 mounted on a common printed circuit board (PCB) 300 to provide sufficient electrical signal transfer capacity between the cards. The cards need to be reliably electrically connected by a connection bridge device 345 separate from the main PCB 300 to provide electrical connections between the cards in addition to those on the main PCB. Obviously this invention may have uses in processing systems other than graphics.

Figure 1:
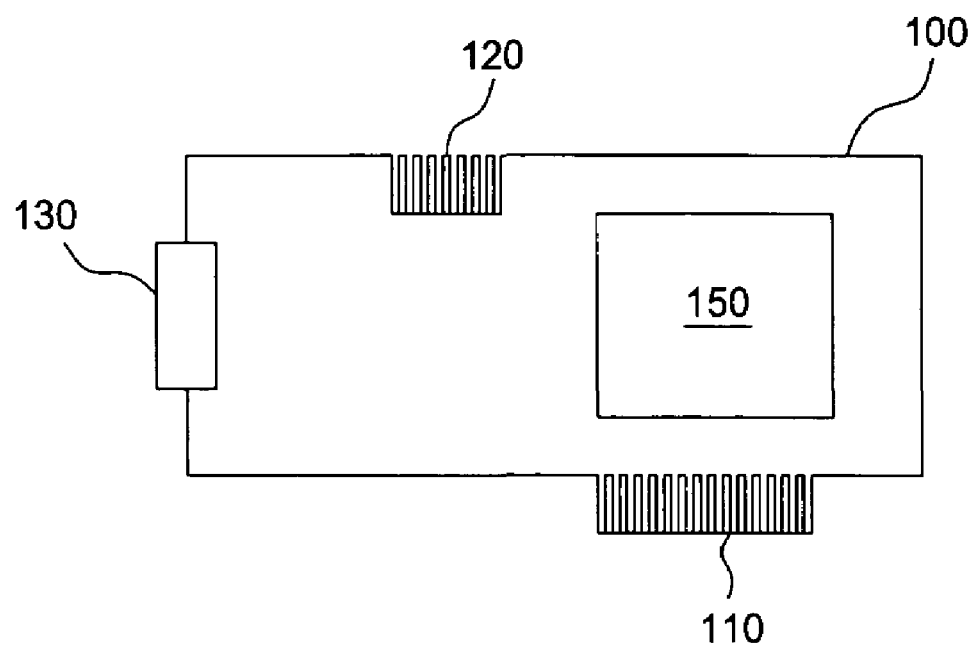
FIG. 1 is an exemplary embodiment of a graphics adaptor card in accordance with the present invention.

FIG. 1 is an exemplary embodiment of a graphics adaptor card 100 of a type which embodies cards 340, 360 in this example. Graphics adaptor card 100 includes a first finger-type system connector 110 that is configured to connect to a system motherboard slot, and a second system connector 120 configured to connect to a connection bridge device to functionally couple graphics adaptor card 100 to a similar type of graphics adaptor card. Conductive "fingers" are affixed to a printed circuit board when graphics adaptor card 100 is manufactured to produce the second system connector 120. The second system connector 120 typically conforms to an industry standard interface specification, such as peripheral component interface express (PCI-Express™, PCI Express®).

In this example, a processor such as a GPU (graphics processing unit) 150 is affixed to the graphics adaptor card 100 and is coupled to the second system connector 120 by wire traces on the printed circuit board. GPU 150 typically receives graphics data and instructions from a host processor through the first system connector 110.

Figure 2:
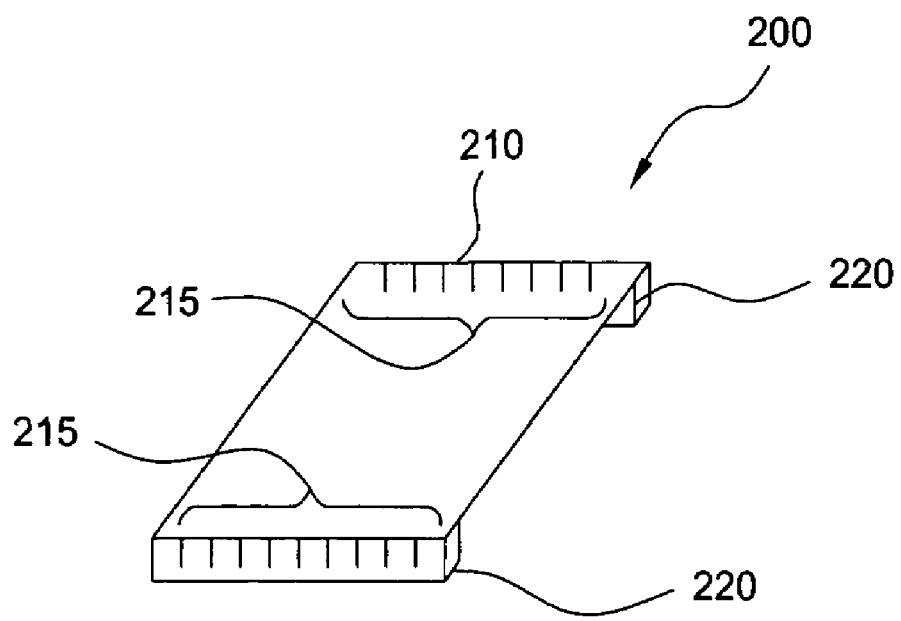
FIG. 2 is an exemplary embodiment of a connection bridge device useful in the present invention.

FIG. 2 is an exemplary embodiment of a connection bridge device 200 in accordance with one or more aspects of the present invention. As described in further detail below in conjunction with FIG. 3, the connection bridge device 200 is configured to couple together two graphics adaptor cards so that signals may be transmitted between the two cards. For example, two or more graphics adaptor cards may be used to render images with improved image quality or two or more graphics adaptor cards may be used to render images at a higher frame rate.

As shown, the connection bridge device 200, includes a connector PCB 210 with a socket 220 affixed to opposing ends of connector PCB 210. Conductive traces 215 are fabricated as part of the sockets 220 of connector PCB 210 to connect pins of socket 220 on one end of connector PCB 210 to selected pins of socket 220 on the opposing end of connector PCB 210 or devices carried on the PCB 210.

Figure 3:
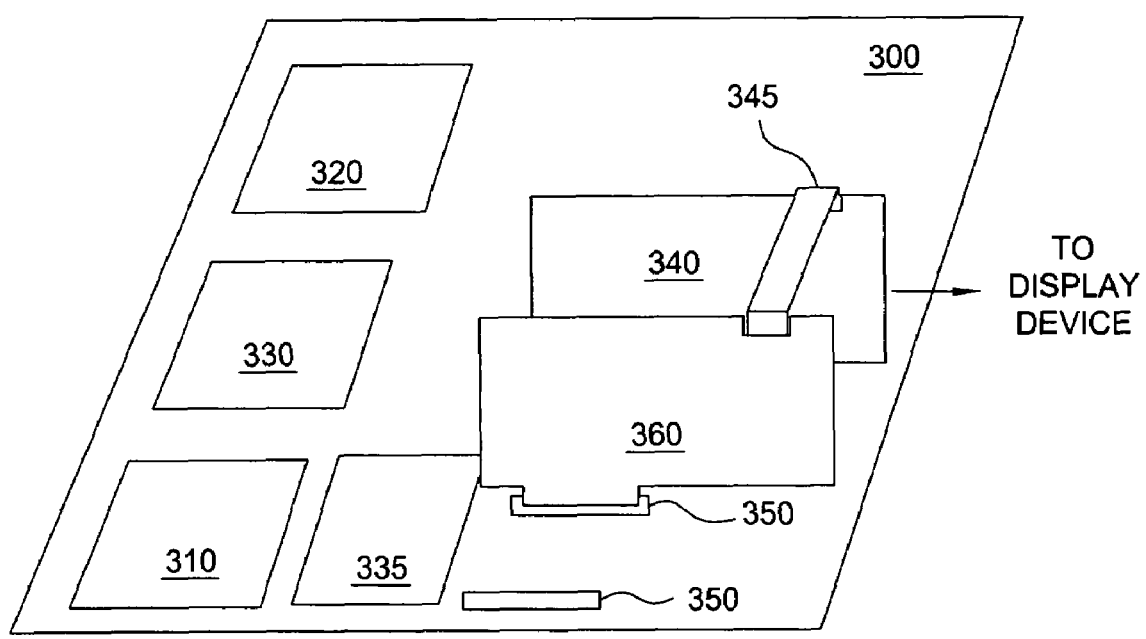
FIG. 3 is an exemplary embodiment of a processing system in which the present invention is especially useful.

FIG. 3 is an exemplary embodiment of a graphics processing system of the type which may well use the present invention. In this example, a motherboard 300 is included within a desktop computer, server, laptop computer, palm-sized computer, tablet computer, game console, cellular telephone, computer based simulator, or the like. Motherboard 300 typically includes a host processor 320, a main memory 310, and a chipset 330 that is directly coupled to a bridge 335. In some embodiments of motherboard 300, chipset 330 may include a system memory bridge and an input/output (I/O) bridge that may include several interfaces such as, Advanced Technology Attachment (ATA) bus, Universal Serial Bus (USB), Peripheral component interface (PCI), or the like. A bridge 335 provides an interface between chipset 330 and any graphics adaptor card installed in a slot 350.

Graphics adaptor cards 340, 360 are coupled to motherboard 300 via a slot 350. A connection bridge device 345, such as shown in FIG. 2, may then be installed to couple together the adaptor cards improve system performance in terms of image quality and/or rendering speed.

Figure 4:
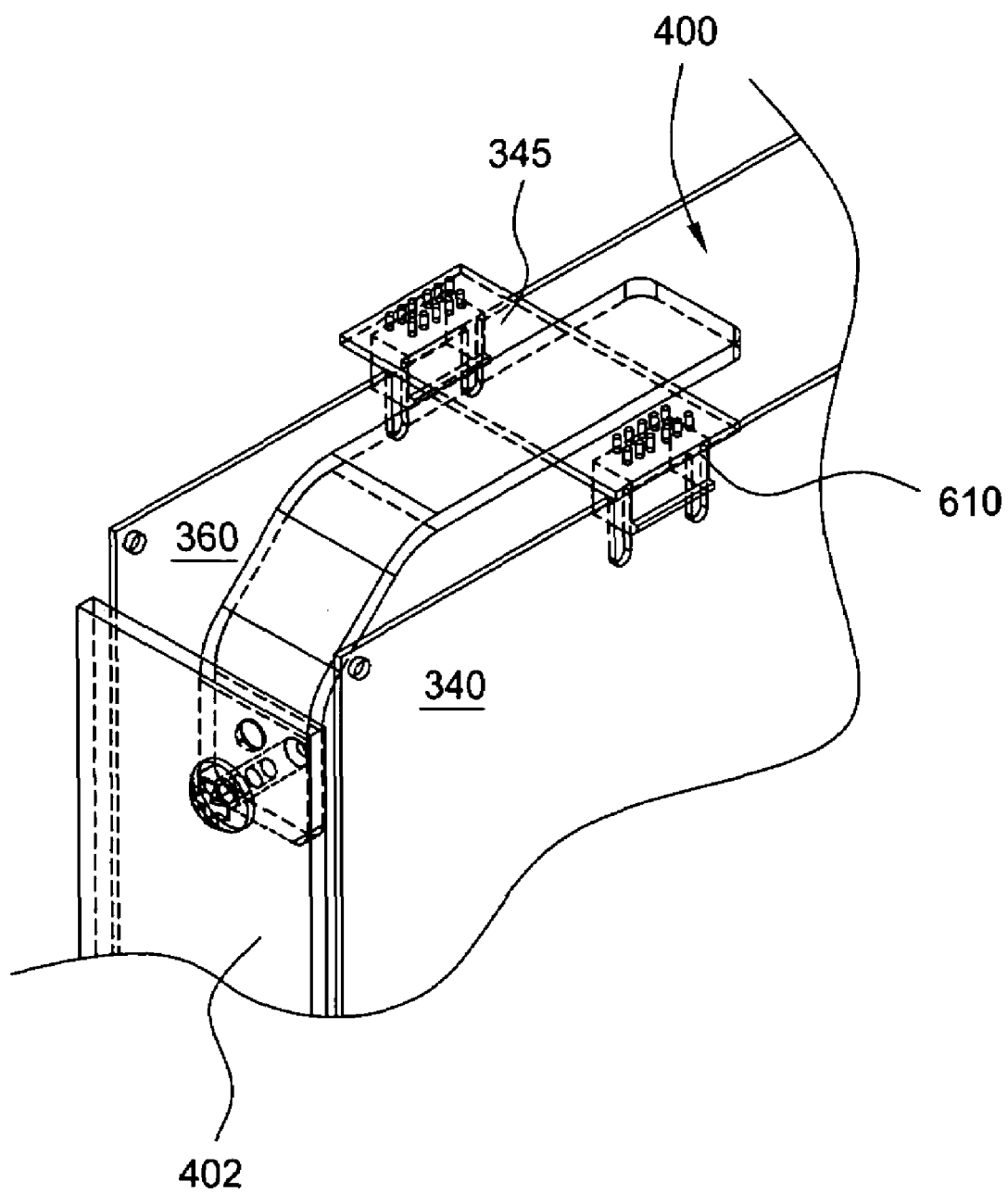
FIG. 4 is a cutaway view of the clip of FIG. 5 assembled in relation to two graphics adaptor cards to retain a connection bridge device in place when experiencing shock and/or vibration.

One problem with the arrangement of FIG. 3 is that, as described previously, when subjected to a sudden substantial shock, or intermittent vibration, the connection bridge device 345 can be displaced, breaking the contact between the sockets of connection bridge device 345 (see sockets 220 of FIG. 2) and the pins carried on the upper edge of each graphics adaptor card 340, 360 (see the second system connector 120 of FIG. 1). Such shock and vibrations may occasionally occur in the environment where the processing system is used; it is very possible when the system is being shipped where it is more frequently subject to long-term vibration or rough handling. To prevent the connection bridge device 345 from being dislodged by shock and vibration, a clip 400, shown in FIG. 4, is mounted from a card support bracket 402, which is coupled to one of graphics adaptor cards 340, 360 such that a portion of the clip 400 extends laterally over an upper surface of the connection bridge device 345. The clip 400 is biased against the upper surface in a direction to retain the position of the connection bridge device 345 such that electrical coupling of the graphics adaptor cards 340, 360 is maintained.

Figure 5:
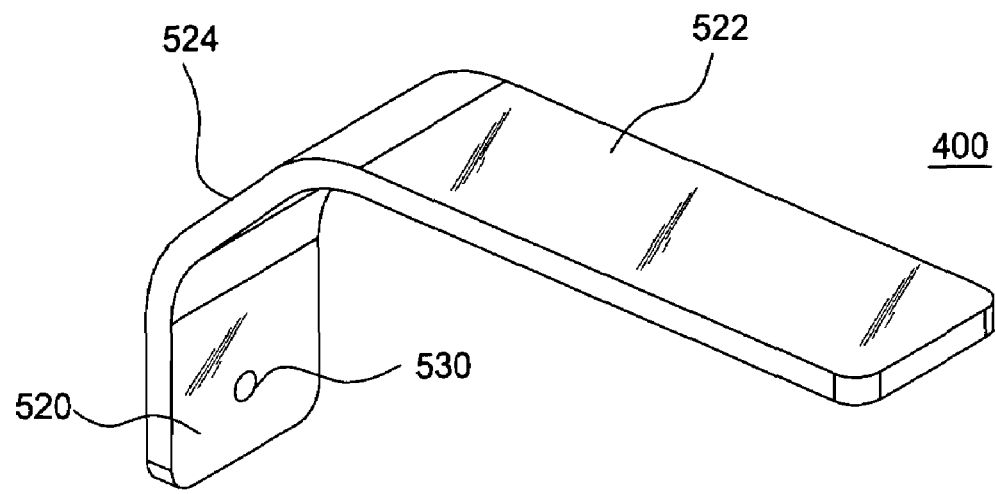
FIG. 5 is a prospective of an exemplary embodiment of the clip of the present invention.

The clip 400 itself is shown in FIG. 5, and preferably comprises a single piece of a non-conductive material. The clip 400 comprises a first section 520, which is to be mounted to the card support bracket 402, and a second section 522, which is approximately perpendicular to the first section 520; these two sections are separated and maintained in relative position by the intermediate section 524.

Figure 6:
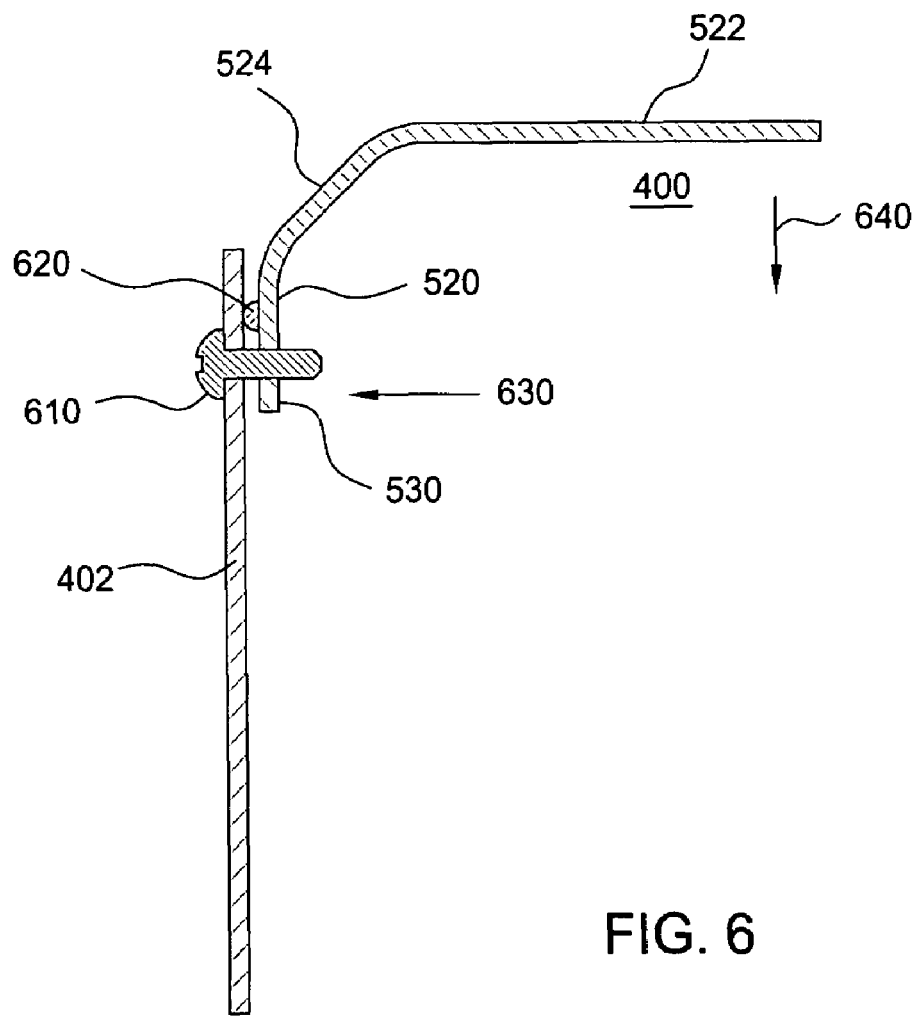
FIG. 6 is side view of the clip of FIG. 5 mounted in an operative position.

As shown in FIG. 6, the clip 400 is mounted to the card support bracket 402 by a screw 610, which is threaded through the card support bracket 402 and the clip 400 (via a hole 530, depicted in FIG. 5). As the screw 610 is tightened, downward pressure is applied by the distal section 522 of the clip 400 onto the upper surface of the connection bridge device 345. The downward movement of the distal section 522 is caused by a bump or boss 620 on the surface of the clip 400 that faces the card support bracket 402. This bump 620 is located preferably directly above the screw hole 530. When the screw 610 is tightened, drawing the lower section 520 of the clip 400 against the card support bracket 402 in the direction of arrow 630, the bump 620 acts as a pivot point and causes the distal section 522 of the clip 400 to press downward against the upper surface of the connection bridge device 345, thereby applying a downward force against the connection bridge device 345, as indicated by arrow 640.

Adoption of this clip provides an inexpensive solution to the problem of the bridge becoming dislodged from the printed circuit cards. The clip itself can be easily fabricated; its mounting requires only the provision of a hole in the card support bracket 402 in an appropriate location to be aligned with the hole 530 in the clip.

Other features and advantages of this invention may be apparent to a person skilled in the art who studies this disclosure. The scope of the invention is limited only by the following claims.

The invention claimed is:

1. A processing system comprising
a printed circuit board;
two upright processor cards supporting electronics thereon, at least one of the processor cards having a card support bracket extending substantially perpendicular to the at least one processor card;
a bridge device functionally connecting the upper edges of the cards; and a clip supported from the card support bracket and extending laterally over the bridge and biased against the bridge to retain the bridge coupling the cards, the clip including a boss on a surface adapted to face a surface of the card support bracket, the clip configured to pivot about the boss to create the bias against the bridge.

2. A system as claimed in claim 1, including a screw passing through an opening in the support bracket and threaded into the clip for causing the clip to pivot about the boss.

3. A system as claimed in claim 1 wherein each of the two processor cards comprises a multi-pin edge connector, the bridge device comprising first and second sockets with conductive traces adapted to electrically couple the multi-pin edge connectors of the two processor cards, the clip bias maintaining a coupling between the first and second sockets and the multi-pin edge connectors.

4. A system as claimed in claim 3, wherein the clip includes a boss on a surface adapted to face a surface of the bracket, the clip configured to pivot about the boss to create the bias against the bridge.

5. A system as claimed in claim 4, including a screw passing through an opening in the support bracket and threaded into the clip for causing the clip to pivot about the boss.

6. A system as claimed in claim 4, wherein the boss is spaced from an opening in the support bracket but aligned therewith, the boss causing the clip to be biased against the bridge.

7. A connection device for establishing and maintaining a reliable connection between first and second processor cards each having electronics thereon coupled to a multi-pin edge connector, the cards being supported in parallel from a printed circuit board, at least one of the processor cards having a card support bracket extending substantially perpendicular to the at least one processor card, a bridge extending between and connecting the upper edges of the cards, and a clip supported from the card support bracket and extending laterally over a bridge and biased against the bridge to retain the bridge coupling the cards, the clip including a boss on a surface adapted to face a surface of the card support bracket, the clip configured to pivot about the boss to create the bias against the bridge.

8. A device as claimed in claim 7 wherein each of the two processor cards comprises a multi-pin edge connector, the bridge device comprising first and second sockets with conductive traces adapted to electrically couple the multi-pin edge connectors of the processor cards, the clip bias maintaining coupling between the first and second sockets mated with the multi-pin edge connectors.

9. A device as claimed in claim 8 including a screw passing through an opening in the support bracket and threaded into the clip for causing the clip to pivot about the boss.

10. A device as claimed in claim 7 including a screw passing through an opening in the support bracket and threaded into the clip for causing the clip to pivot about the boss.

11. A device as claimed in claim 10 wherein the boss is spaced from an opening in the support bracket but aligned therewith to cause the clip to be biased against the bridge.

12. A device as claimed in claim 11 wherein each of the two processor cards comprises a multi-pin edge connector, the bridge device comprising first and second sockets with conductive traces adapted to electrically couple the multi-pin edge connectors of the processor cards, the chip bias maintaining coupling between the first and second sockets mated with the multi-pin edge connectors.

13. A clip for retaining a bridge device in position to electrically connect two parallel mounted graphics adaptor cards, the bridge device comprising sockets for mating with an edge connector on each of the cards, at least one of the cards including a card support bracket extending substantially perpendicular to the at least one card, the clip comprising a first region having a screw hole and a boss on a surface of the first region adapted to face a surface of the card support bracket, and a second region substantially perpendicular to the first region and adapted to overlie the bridge.

14. A clip as claimed in claim 13 wherein the boss is spaced from and aligned with the screw hole in the first region so that when a screw is passed through the card support bracket and the screw hole, the clip is biased against the bridge.

* * * * *